(12) United States Patent
Monk

(10) Patent No.: US 12,127,716 B2
(45) Date of Patent: Oct. 29, 2024

(54) ERGONOMIC HANDLE AND UTENSIL HOLDER ACCESSORY

(71) Applicant: Kitchinventions, LLC, Jupiter, FL (US)

(72) Inventor: Derek Monk, Jupiter, FL (US)

(73) Assignee: Kitchinventions, LLC, Jupiter, FL (US)

( * ) Notice: Subject to any disclaimer, the term of this patent is extended or adjusted under 35 U.S.C. 154(b) by 590 days.

(21) Appl. No.: 17/469,688

(22) Filed: Sep. 8, 2021

(65) Prior Publication Data

US 2022/0071452 A1   Mar. 10, 2022

Related U.S. Application Data

(60) Provisional application No. 63/075,681, filed on Sep. 8, 2020.

(51) Int. Cl.
*A47J 45/10* (2006.01)

(52) U.S. Cl.
CPC .................... *A47J 45/10* (2013.01)

(58) Field of Classification Search
CPC ........................................ A47J 45/10
See application file for complete search history.

(56) References Cited

U.S. PATENT DOCUMENTS

| | | | | |
|---|---|---|---|---|
| 4,822,087 A * | 4/1989 | DeCarlo | ............... | A01K 77/00 294/58 |
| 5,145,210 A * | 9/1992 | Lennon | .................. | B62K 21/26 280/270 |
| 5,802,960 A * | 9/1998 | Graj | ....................... | A47J 45/06 99/422 |
| 6,698,064 B1 * | 3/2004 | Graj | ....................... | A47J 45/071 16/425 |
| D509,034 S * | 8/2005 | Morelock | ................... | D32/53.1 |
| 8,464,399 B2 * | 6/2013 | Herigstad | ............... | A47J 45/06 16/424 |
| 9,149,925 B1 * | 10/2015 | Van Valin | ................ | A01D 9/00 |
| 9,629,473 B2 * | 4/2017 | Rawls-Meehan | ...... | A61H 23/02 |

\* cited by examiner

*Primary Examiner* — Stephen A Vu
(74) *Attorney, Agent, or Firm* — Geoffrey Lottenberg; Berger Singerman LLP

(57) ABSTRACT

An ergonomic handle and utensil holder accessory has tubular main body with a wrist rest extending from the distal end. A grip extends upward from the main body and is threadingly engaged with the main body. The handle of a pot, pan, utensil, or other object is inserted into the main body and the grip is screwed in to tightened the holder to the target object. The user grabs the grip by hand such that the user's wrist and forearm rests on the wrist rest. The holder enhances the user's grip on the target object and provides enhanced ergonomics and lifting power.

9 Claims, 3 Drawing Sheets

ERGONOMIC HANDLE AND UTENSIL HOLDER ACCESSORY

CROSS REFERENCE TO RELATED APPLICATIONS

This application claims the benefit of U.S. Provisional Application No. 63/075,681 filed on Sep. 8, 2020.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following description, for the purposes of explanation, numerous specific details are set forth in order to provide a thorough understanding of the holder of the present invention. It will be apparent, however, to one skilled in the art that the holder may be practiced without some of these specific details. Throughout this description, the embodiments and examples shown should be considered as exemplars, rather than as limitations on the holder. That is, the following description provides examples, and the accompanying drawings show various examples for the purposes of illustration. However, these examples should not be construed in a limiting sense as they are merely intended to provide examples of the holder rather than to provide an exhaustive list of all possible implementations of the holder.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
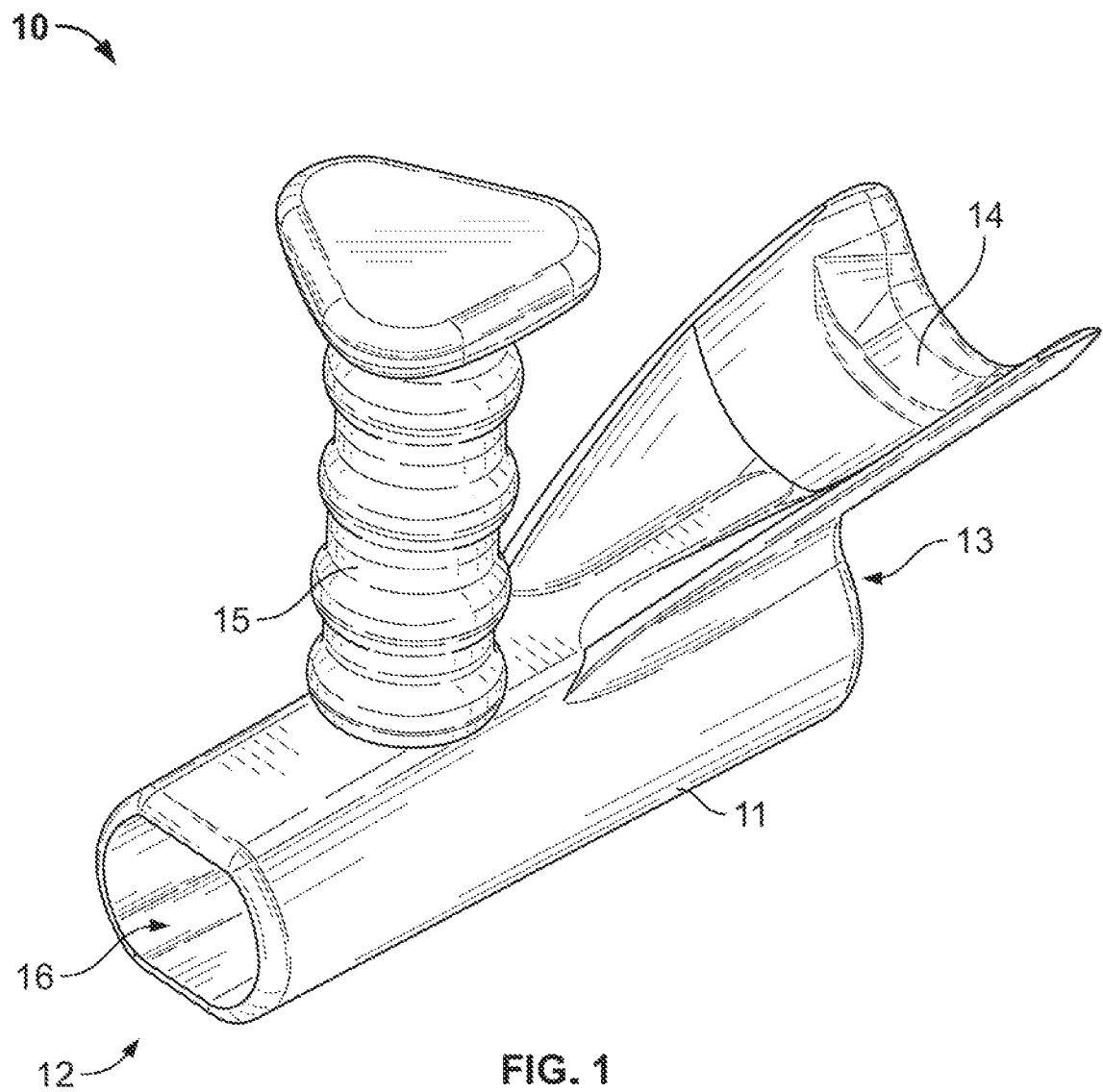
FIG. 1 is a perspective view of the holder.
Figure 2:
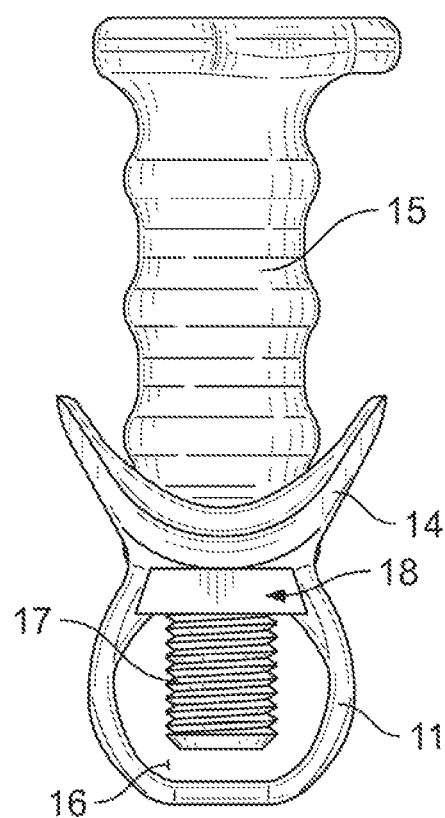
FIG. 2 is a rear view of the holder.
Figure 3:
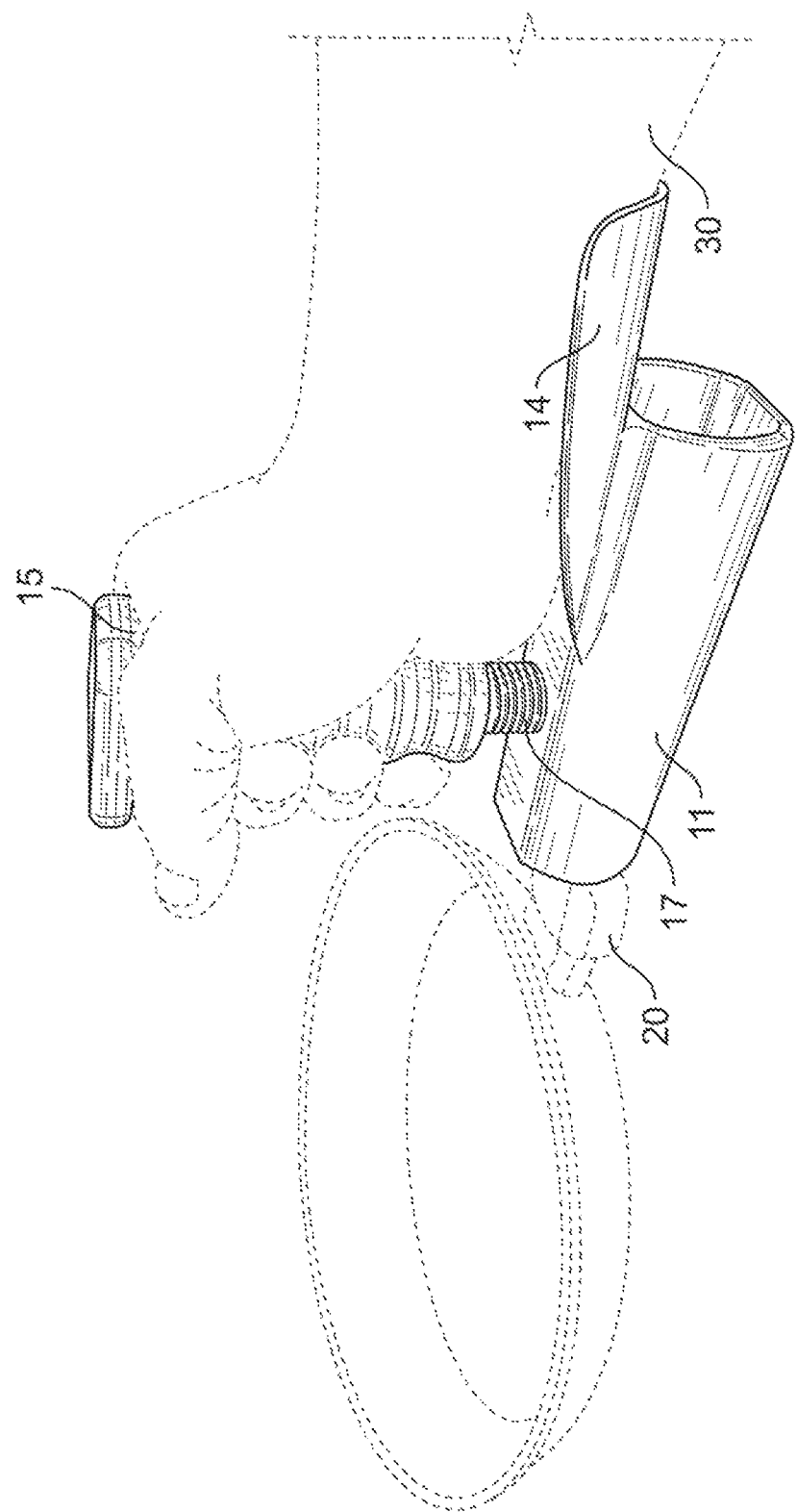
FIG. 3 is a perspective view of the holder in use.

Referring to FIGS. 1-3, shows is a holder device 10 that comprises a main body 11 having a proximal end 12 and a distal end 13. In some embodiments, the main body 11 is at least partially hollow and includes a receiving cavity 16. In some embodiments, the main body 11 is generally tubular thereby defining the receiving cavity 16 at is hollow inside portion. Extended rearward and upward about the distal end 13 of the main body 11 is a rest 14. In some embodiments, the rest 14 extends and terminates beyond the distal end 13 of the body 11. Extending upward from the main body 11 is a grip 15. In some embodiments, the grip is substantially perpendicular to the length of the main body 11.

With reference more particularly to FIG. 2, in some embodiments the grip 15 is threadingly attached to main body 11 by way of thread end 17. In some embodiments, main body 11 includes an opening 18 which has threads corresponding to the threads only threaded end 17. Accordingly, in some embodiments grip 15 is adjustable as to and/or removable from main body 11. Other attachments methods such as clasps, snap-fit, or interference fits may employed in conjunction with or as an alternative to the threaded engagement.

With reference to FIG. 3, shown is the holder device 10 shown in use in conjunction with an exemplary pan 20 and a user 30. The handle of the pan 20 is inserted into the main body 11, at receiving cavity 16. The grip 15 is threadingly engaged with the main body 11 such that it functions as a "set screw" to secure the main body 11 to the handle of the target pan or utensil. Accordingly, the threaded end 17 of the grip is configured to be adjustable to the size and shape of the handle of the target pan 20 such that the holder device 10 can be used in a variety of applications. In use, the user attaches the main body 11 to the pan 20 and then grabs a hold of grip 15. In doing so, the wrist and forearm area of the user's arm will align adjacent to the rest 14 such that the wrist and forearm area of the user's arm can rest comfortably on the rest 14. This provides substantially enhanced lifting power and leverage when the user lifts and moves the pan 20 in that rest 14 acts to counterbalance and spread the weight and pressure of the pan and its contents.

Accordingly, it is appreciated and understood that the instant holder device 10 provides means to enhance the ergonomics, usability, and functionality of existing pots and pans, obviating the need to replace or alter the handles of such existing pots and pans. It is also recognized and understood that the holder device 10 can be used in conjunction with objects other than the handles of pots and pans—for example, the holder device 10 can be used with utensils or tools or other objects with a handle or extended portion where the user desires enhanced ergonomics and grabbing or lifting power.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A holder for a target object, comprising:
   a main body having a proximal end, a distal end, and an internal receiving cavity;
   a rest extending rearward and upward about the distal end of the main body; and
   a grip extending upward from the main body,
   wherein the grip includes an end configured to pass through an opening on the main body and make contact with a portion of the target object to secure the main body to the target object, and wherein the end of the grip is threadingly engaged with the main body.

2. The holder of claim 1, wherein the opening on the main body is configured to receive the end of the grip.

3. The holder of claim 1, wherein the main body is tubular.

4. The holder of claim 1, wherein the grip is removably and adjustably attachable to the main body.

5. A method of providing enhanced grip on a target object, comprising:
   a. providing a holder having a main body having a proximal end, a distal end, and an internal receiving cavity; a rest extending rearward and upward about the distal end of the main body; and a grip extending upward from the main body;
   b. inserting a portion of the object into the internal receiving cavity of the holder; and
   c. gripping the grip such that a user's wrist and arm is adjacent to and rests on the rest,
      wherein the grip includes an end configured to pass through an opening on the main body and make contact with the portion of the object inside of the internal receiving cavity of the holder to secure the main body to the object.

6. The method of claim 5, wherein the end of the grip is threadingly engaged with the main body.

7. The method of claim 6 wherein the opening on the main body is configured to receive the end of the grip.

8. The method of claim 5, wherein the main body is tubular.

9. The method of claim 5, wherein the grip is removably and adjustably attachable to the main body.

* * * * *